US011136074B2

United States Patent
Nakata et al.

(10) Patent No.: US 11,136,074 B2
(45) Date of Patent: Oct. 5, 2021

(54) FRONT DEFLECTOR (71) Applicant: Mazda Motor Corporation, Hiroshima (JP)

(72) Inventors: Akihiro Nakata, Higashihiroshima (JP); Masaaki Bessho, Aki-gun (JP); Kentaro Nomura, Hiroshima (JP); Yohei Izumi, Hatsukaichi (JP); Takashi Watanabe, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/722,553

(22) Filed: Dec. 20, 2019

(65) Prior Publication Data
US 2020/0207428 A1 Jul. 2, 2020

(30) Foreign Application Priority Data
Dec. 26, 2018 (JP) .............................. JP2018-242858

(51) Int. Cl.
B62D 35/00 (2006.01)
B62D 35/02 (2006.01)
B62D 37/02 (2006.01)

(52) U.S. Cl.
CPC ........... *B62D 35/005* (2013.01); *B62D 35/02* (2013.01); *B62D 37/02* (2013.01)

(58) Field of Classification Search
CPC ............................... B62D 35/005; B62D 35/02
USPC ........................................... 296/180.1, 180.2
See application file for complete search history.

(56) References Cited

U.S. PATENT DOCUMENTS

| 8,210,600 | B1 * | 7/2012 | Verhee | B62D 35/005 |
| | | | | 296/180.1 |
| 10,059,291 | B2 * | 8/2018 | Kishima | B60R 19/48 |
| 2007/0023238 | A1 | 2/2007 | Ramsay et al. | |
| 2015/0225026 | A1 | 8/2015 | Ohira et al. | |
| 2015/0274224 | A1 * | 10/2015 | Ito | B62D 35/02 |
| | | | | 296/180.1 |
| 2016/0176450 | A1 | 6/2016 | Wolf | |
| 2016/0272258 | A1 | 9/2016 | Gibson et al. | |
| 2017/0282980 | A1 | 10/2017 | Seitz | |

(Continued)

FOREIGN PATENT DOCUMENTS

| DE | 102006014443 A1 * | 10/2007 | .......... B62D 35/005 |
| DE | 10 2014 222 268 A1 | 5/2016 | |

(Continued)

OTHER PUBLICATIONS

Extended European Search Report dated May 20, 2020 in European Patent Application No. 19216538.9, 9 pages.

*Primary Examiner* — Jason S Daniels
(74) *Attorney, Agent, or Firm* — Xsensus LLP (57) ABSTRACT A front deflector configured to be provided on a surface ahead of a front wheel of a vehicle. The front deflector includes a first opening forward of the vehicle, the first opening configured to receive air into an inner space of the front deflector when the vehicle travels forward; a guide wall that directs the air received into the inner space from the first opening to at least a vehicle-width-direction outer side in the inner space; and a second opening that opens rearward of the first opening in a position that overlaps with a front wheel of the vehicle, and exhausts the air in the inner space to the vehicle-width-direction outer side.

17 Claims, 8 Drawing Sheets (56) References Cited

U.S. PATENT DOCUMENTS

2017/0299006 A1* 10/2017 Shi .......................... F16D 65/78
2018/0251165 A1     9/2018 Shibutake et al.
2020/0010129 A1*  1/2020 Ikawa .................. B62D 35/005

FOREIGN PATENT DOCUMENTS

| DE | 10 2014 118 800 A1 | 6/2016 |
| DE | 10 2016 104 359 A1 | 9/2016 |
| FR |       2 858 796 A1 | 2/2005 |
| JP |       2017-77846 A | 4/2017 |

* cited by examiner

FRONT DEFLECTOR

CROSS-REFERENCE TO RELATED APPLICATION

The present application is claims priority to JP 2018-242858, filed Dec. 26, 2018, the entire contents of which are incorporated herein by reference.

BACKGROUND

Field of the Disclosure

The present disclosure relates to a front deflector provided on a lower surface ahead of a front wheel in a vehicle.

Description of the Related Art

Hitherto, the turbulence of air flow caused by front wheels has been suppressed in order to improve fuel efficiency of a vehicle. The turbulence of the air flow is caused when traveling air that flows under the floor of the front portion of the vehicle and reaches the front wheels when the vehicle travels forward is disturbed by the rotation of the front wheels.

For example, in Japanese Patent Laid-Open No. 2017-77846, a front deflector is installed on a lower surface that is ahead of a front wheel well in the vehicle so that the traveling air caused when the vehicle (automobile) travels forward does not come into contact with the front wheels as much as possible. The front deflector includes a wall portion that extends in the up-down direction so as to protrude downward from the lower surface that is ahead of the front wheel well in the vehicle. The traveling air is caused to hit the wall portion.

SUMMARY

The inventors have performed eager analysis for further improvement of aerodynamic characteristics. As a result, the following matter has become clear. Even when a front deflector as that in Japanese Patent Laid-Open No. 2017-77846 described above is provided on the front side of a front wheel, an end surface of the front wheel on the vehicle-width-direction outer side thereof is generally located on the vehicle-width-direction outer side than an end of the wall portion, which extends in the up-down direction, of the front deflector on the vehicle-width-direction outer side thereof, and hence the traveling air that has passed through the vehicle-width-direction outer side with respect to the wall portion of the front deflector hits the portion of the front wheel on the vehicle-width-direction outer side thereof.

Thus, a fin portion that protrudes downward and guides the traveling air to the vehicle-width-direction outer side is conceived to be provided on the lower surface of the front deflector. The fin portion can be formed by inclining the end surface of the wall portion of the front deflector on the vehicle front side thereof in Japanese Patent Laid-Open No. 2017-77846 described above to be located on the vehicle rear side as the end surface approaches the vehicle-width-direction outer sides, for example. By the fin portion as above, the traveling air that has hit the end surface of the fin portion on the vehicle front side thereof is deflected to the vehicle-width-direction outer side. The deflected traveling air passes through the vehicle-width-direction outer side with respect to the front wheel together with the traveling air passing through the vehicle-width-direction outer side with respect to the fin portion.

However, even when the fin portion as above is provided on the front deflector, the traveling air deflected by the fin portion may hit the front wheel depending on the positional relationship between the end surface of the front wheel on the vehicle-width-direction outer side thereof and the end of the fin portion of the front deflector on the vehicle-width-direction outer side thereof. Thus, there is room for improvement for more reduction of the air resistance of the vehicle.

The present disclosure has been made in view of the points as above, and an object thereof is to provide a front deflector capable of suppressing the hitting of traveling air, which is caused when a vehicle travels forward, against a front wheel as much as possible.

In order to achieve the object described above, a front deflector according to an aspect of the present disclosure, which is provided on a lower surface ahead of a front wheel in a vehicle, includes: an air inlet that opens forward of the vehicle, and is for taking air into an inner space of the front deflector when the vehicle travels forward; a guiding portion that directs the air taken into the inner space from the air inlet to a vehicle rear side and a vehicle-width-direction outer side in the inner space; and an air outlet that opens rearward of the vehicle in a position that overlaps with a front wheel in a front view of the vehicle, and diagonally exhausts the air in the inner space to the vehicle-width-direction outer side toward the vehicle rear side.

With the configuration described above, air is taken into the inner space of the front deflector from the air inlet, and the air is directed to the vehicle rear side and the vehicle-width-direction outer side in the inner space by the guiding portion. The directed air is diagonally exhausted to the vehicle-width-direction outer side from the air outlet toward the vehicle rear side. The air (traveling air) exhausted from the air outlet can be prevented from hitting the front wheel in accordance with the direction in which the air is directed by the guiding portion. The traveling air exhausted from the air outlet pushes out the traveling air that has passed through the vehicle-width-direction outer side with respect to the front deflector to the vehicle-width-direction outer side so that the traveling air does not hit the front wheel. Therefore, the hitting of the traveling air against the front wheel can be suppressed as much as possible.

In the front deflector described above, a fin portion that protrudes downward and guides the traveling air, which is caused when the vehicle travels forward, to the vehicle-width-direction outer side by an end surface on a vehicle front side is preferred to be provided on the lower surface of the front deflector, and the air outlet is preferred to open in the end surface of the fin portion on the vehicle rear side.

As a result, the traveling air that has hit the end surface of the fin portion on the vehicle front side thereof can be deflected to the vehicle-width-direction outer side by the fin portion, and the traveling air deflected by the fin portion pushes out the traveling air that has passed through the vehicle-width-direction outer side with respect to the front deflector to the vehicle-width-direction outer side. Now, in the configuration in which the front deflector does not include the air inlet, the guiding portion, and the air outlet, the traveling air deflected by the fin portion may hit the front wheel. However, in the present disclosure, the air (traveling air) exhausted from the air outlet pushes out the traveling air deflected by the fin portion to the vehicle-width-direction outer side so that the traveling air does not hit the front wheel. As a result, the traveling air that has passed through the vehicle-width-direction outer side with respect to the front deflector is also pushed out to the vehicle-width-direction outer side so as not to hit the front wheel. The air outlet opens in the end surface of the fin portion on the vehicle rear side thereof, and hence the opening area of the air outlet can be increased and the exhaust amount of the air from the air outlet can be increased. As a result, it becomes more difficult for the traveling air deflected by the fin portion to hit the front wheel.

In the front deflector described above, the air outlet is preferred to be located on the vehicle-width-direction outer side than the air inlet.

As a result, the air directed to the vehicle rear side and the vehicle-width-direction outer side by the guiding portion is diagonally and smoothly exhausted to the vehicle-width-direction outer side from the air outlet toward the rear side with great force, and the hitting of the traveling air exhausted from the air outlet against the front wheel can be effectively suppressed. The traveling air exhausted from the air outlet can push out the traveling air that has passed through the vehicle-width-direction outer side with respect to the front deflector to the vehicle-width-direction outer side in an excellent manner.

In one embodiment of the front deflector described above, the front deflector is formed by two members including an upper member and a lower member, and the lower-side member is fixed to the upper-side member at an peripheral portion of the lower-side member, and includes a hooking portion to be hooked on the upper-side member at a portion other than the peripheral portion.

In other words, the lower-side member of the front deflector is generally made of soft synthetic resin such as synthetic rubber, and hence portions (in particular, the central portion and the portion in the vicinity thereof) other than the peripheral portion in the lower-side member are easily displaced to the lower side. Thus, by providing the hooking portion on the portion other than the peripheral portion in the lower-side member and hooking the hooking portion on the upper-side member, the portion other than the peripheral portion in the lower-side member can be prevented from being displaced to the lower side.

In the embodiment described above, the guiding portion is preferred to be formed by a wall rising portion vertically disposed on the lower-side member, and the hooking portion is preferred to be provided on an upper end surface of the wall rising portion.

As a result, the hooking portion can prevent the portion other than the peripheral portion in the lower-side member from being displaced to the lower-side, the deformation of the guiding portion (wall rising portion) can also be prevented, and the air can be securely directed to the vehicle rear side and the vehicle-width-direction outer side.

As described above, the front deflector according to the aspect of the present disclosure can suppress the hitting of the traveling air, which is caused when the vehicle travels forward, against the front wheel as much as possible.

DETAILED DESCRIPTION

An embodiment of the present disclosure is described in detail below on the basis of the drawings.

Figure 1:
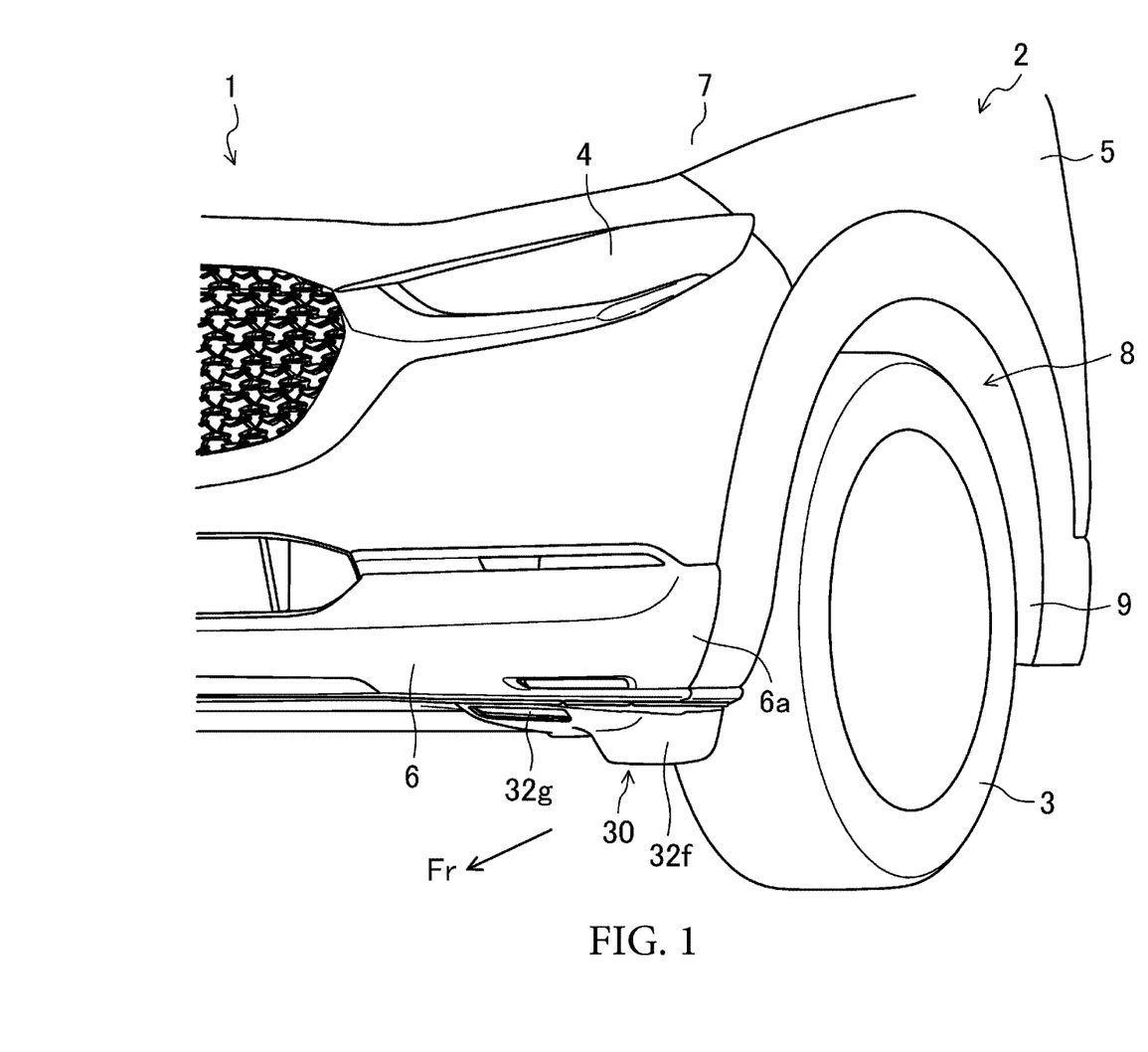
FIG. 1 is a perspective view illustrating a part (left-front-side portion) of a front portion of a vehicle on which a front deflector according to an embodiment of the present disclosure is provided.
Figure 2:
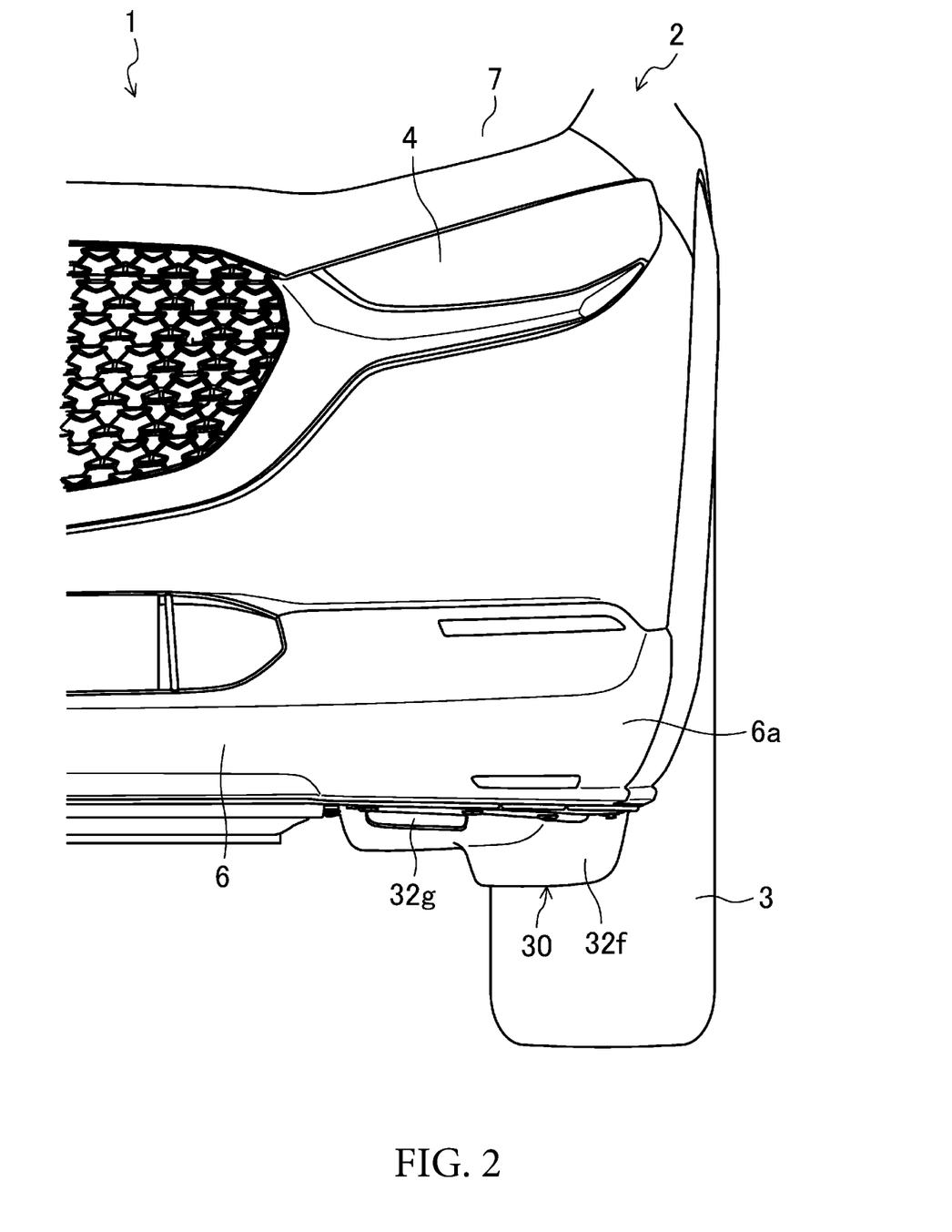
FIG. 2 is a front view of the left-front-side portion of the vehicle described above.
Figure 3:
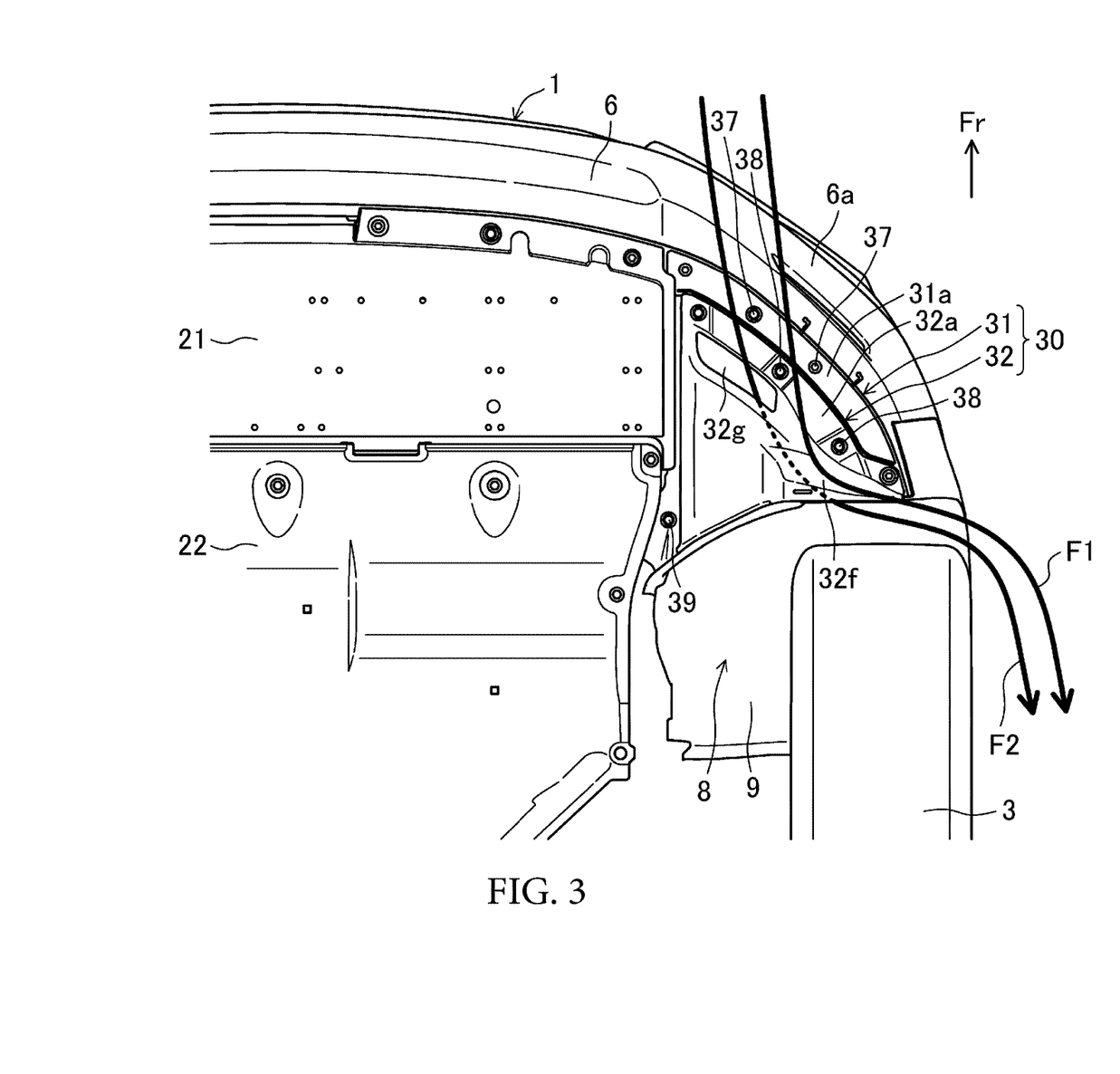
FIG. 3 is a bottom view of the left-front-side portion of the vehicle described above.
Figure 4:
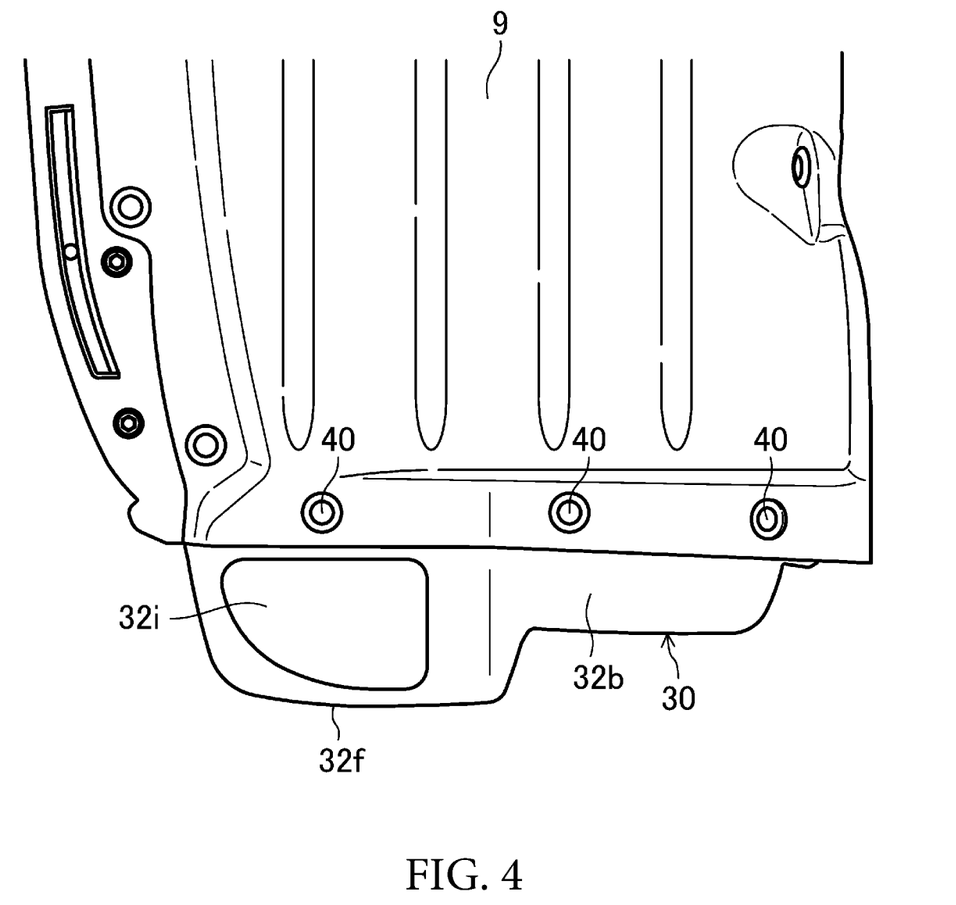
FIG. 4 illustrates a lower portion of a vehicle front-side portion of a mud guard and the front deflector seen from the vehicle-rear side.

FIG. 1 to FIG. 3 illustrate a part (left-front-side portion) of a front portion 2 of a vehicle 1 (an automobile in this embodiment) on which a front deflector 30 according to an embodiment of the present disclosure is provided. "Front", "rear", "left", "right", "upper", and "lower" with respect to the vehicle 1 are simply referred to as "front", "rear", "left", "right", "upper", and "lower" below. In the description below, only the left side is illustrated for components that form a left-and-right pair (for example, front wheels 3). Note that, in FIG. 1, arrow Fr indicates a direction ahead of the vehicle 1 (the same applies to FIG. 3, FIG. 5, FIG. 6, FIG. 7A, and FIG. 7B).

The front portion 2 of the vehicle 1 is a portion anterior to a passenger compartment which a driver of the vehicle 1 enters, and includes a mounting space (including an engine compartment) in which components relating to the traveling of the vehicle 1 such as an engine, a transmission, a cooling apparatus, a suspension apparatus, a steering apparatus, and the left-and-right pair of the front wheels 3 are mounted, and lights toward ahead or sides of the vehicle 1 such as headlights 4 and fog lamps.

The front portion 2 of the vehicle 1 includes a left-and-right pair of front fenders 5 forming the side surfaces on both of left and right sides of the front portion 2, a front bumper 6 disposed on the front ends of the left-and-right pair of front fenders 5 (the front end of the vehicle 1), and a hood 7 covering an upward opening of the mounting space (engine compartment) described above surrounded by the left-and-right pair of front fenders 5 and the front bumper 6.

Both end portions of the front bumper 6 in the vehicle width direction (left and right direction) are corner portions 6a that go around the sides on both of left and right sides from the front end of the vehicle 1. The left and right corner portions 6a are formed in a round shape so as to be positioned rearward toward the vehicle-width-direction outer sides in a bottom view of the vehicle 1 (see FIG. 3).

A left-and-right pair of front wheel wells 8 in which the left and right front wheels 3 are accommodated are provided in the lower sides of the left and right front fenders 5. The front wheel wells 8 are covered with mud guards 9, and the mud guards 9 prevent mud, pebbles, and water drops splashed by the front wheels 3 from entering the mounting space described above. For example, the mud guards 9 are made of hard synthetic resin such as polypropylene, and are formed in a substantially arc shape so as to extend along the upper-side portions of the front wheels 3 in a side view of the vehicle 1.

On the lower surface (bottom surface) in the front portion 2 of the vehicle 1, a front-side under cover 21, and a rear-side under cover 22 located on the rear side thereof are provided. The rear-side under cover 22 is located on the front side of a suspension cross member (not shown) that extends in the vehicle width direction, and covers the lower side of the engine described above.

As illustrated in FIG. 1 to FIG. 4, a left-and-right pair of front deflectors 30 are provided on the lower surface of the front portion 2 of the vehicle 1 that is ahead of the front wheels 3. Each of the front deflectors 30 are provided in a portion surrounded by the front end of the front wheel well 8 (the front end of the mud guard 9), the front bumper 6, and the front-side under cover 21. In other words, the front deflector 30 is provided on the lower surface that is ahead of the front wheel well 8 in the vehicle 1 so as to be separated from the front wheel 3 at a position ahead of the front wheel 3. The front deflectors 30 reduce the air resistance of the vehicle 1 by preventing the traveling air caused when the vehicle 1 travels forward from hitting the front wheels 3.

The left and right front deflectors 30 are attached to symmetrical positions with respect to the center of the vehicle 1 in the vehicle width direction, and are formed in symmetrical shapes with respect to the center of the vehicle 1 in the vehicle width direction. The configurations of the left and right front deflectors 30 are basically the same, and hence the front deflector 30 on the left side is described in detail below. The expressions of "front", "rear", "left", "right", "upper", and "lower" with respect to the front deflector 30 on the left side described below are "front", "rear", "left", "right", "upper", and "lower" in a state in which the front deflector 30 on the left side is provided on the vehicle 1, and are the same as "front", "rear", "left", "right", "upper", and "lower" with respect to the vehicle 1.

Figure 5:
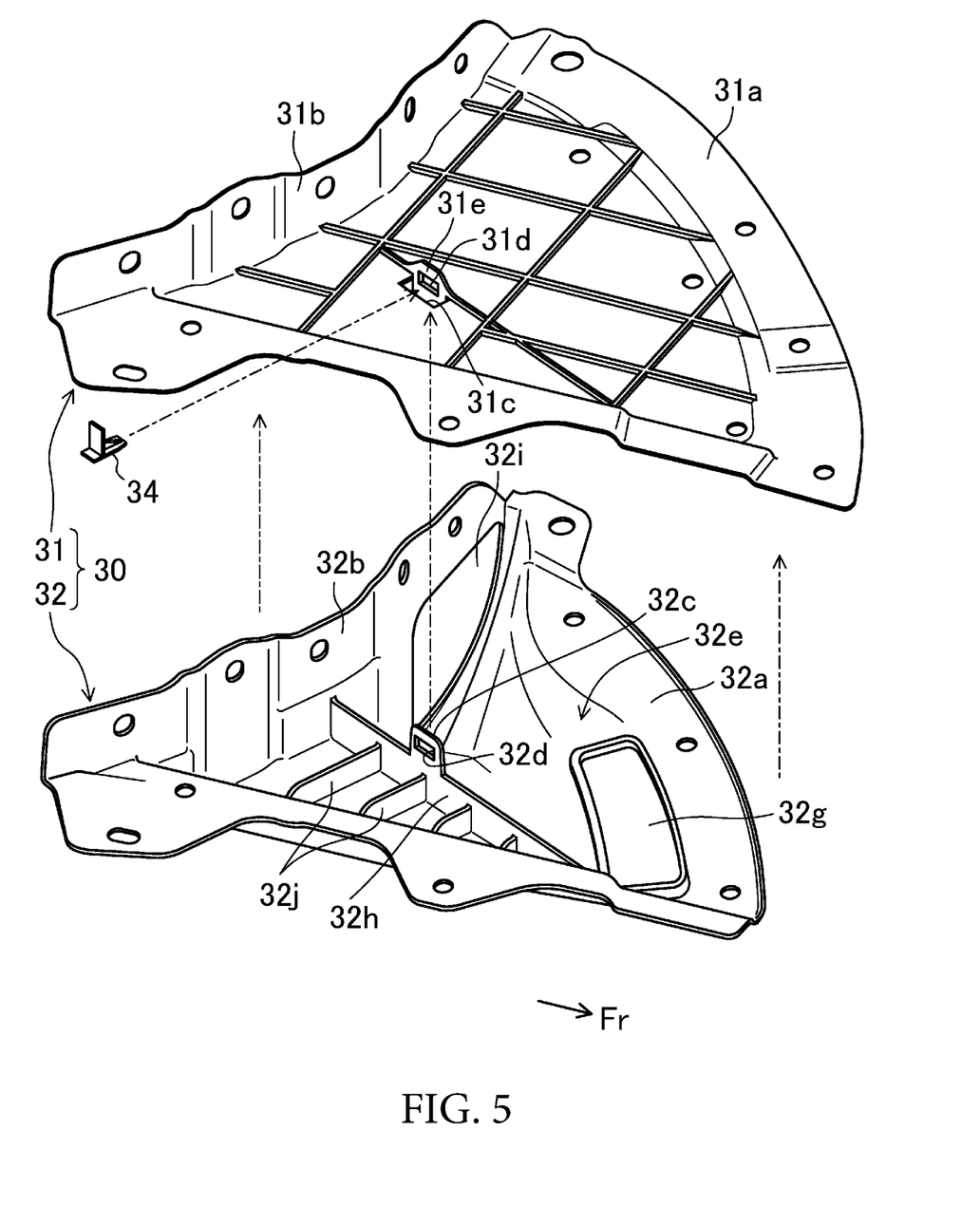
FIG. 5 is an exploded perspective view illustrating an upper-side member, a lower-side member, and a clip in the front deflector.

In this embodiment, the front deflector 30 on the left side (hereinafter referred to as the front deflector 30) is formed by two members including an upper member and a lower member that are an upper-side member 31 and a lower-side member 32 as illustrated in FIG. 5. The upper-side member 31 is formed by a metal plate material, and the lower-side member 32 is formed by soft synthetic resin such as synthetic rubber having flexibility.

The upper-side member 31 includes a curved edge portion 31a from the front end to the end on the vehicle-width-direction outer side formed in a shape (round shape) similar to the corner portion 6a of the front bumper 6 in a bottom view of the vehicle 1 (see FIG. 3). The curved edge portion 31a is mounted and fixed on the lower surface of the corner portion 6a by bolts 37 at a plurality of places. The rear end edge portion of the upper-side member 31 is a bent portion 31b that is bent upward.

The lower-side member 32 includes a curved edge portion 32a formed in a round shape as with the curved edge portion 31a and located on the inner side of the curved edge portion 31a of the upper-side member 31. The curved edge portion 32a is mounted and fixed to the upper-side member 31 by clips 38 at a plurality of places.

An end edge portion of the lower-side member 32 on the vehicle-width-direction inner side thereof vertically overlaps with an end edge portion of the upper-side member 31 on the vehicle-width-direction inner side thereof, and is mounted and fixed on the upper-side member 31 by bolts 39 at a plurality of places. The end edge portions of the upper-side member 31 and the lower-side member 32 on the vehicle-width-direction inner side thereof are supported on the front-side under cover 21 and the rear-side under cover 22.

The rear end edge portion of the lower-side member 32 is a vertical wall portion 32b rising to the upper side, and the vertical wall portion 32b is mounted and fixed on the bent portion 31b of the upper-side member 31 by clips 40 at a plurality of places. A front end portion of the mud guard 9 is also mounted and fixed on the bent portion 31b together with the vertical wall portion 32b by the clips 40 (see FIG. 4).

As described above, the lower-side member 32 is fixed to the upper-side member 31 by the clips 38 and 40 and the bolts 39 at a plurality of places in the peripheral portion thereof. The lower-side member 32 includes a hooking portion 32c to be hooked on the upper-side member 31 in a portion other than the peripheral portion described above. In this embodiment, the hooking portion 32c is provided so as to extend to the upper side from the upper end surface of a wall rising portion 32h described below. A clip insertion hole 32d through which a clip member 34 is inserted is formed in the hooking portion 32c.

When the lower-side member 32 is fixed to the upper-side member 31, the hooking portion 32c passes through a through hole 31c formed in the upper-side member 31 and is exposed on the upper side of the upper-side member 31. A protruding portion 31e in which a clip insertion hole 31d is formed is provided on the side of the through hole 31c on the upper surface of the upper-side member 31. The clip insertion hole 32d in the hooking portion 32c exposed on the upper side of the upper-side member 31 faces the clip insertion hole 31d in the protruding portion 31e. The clip member 34 is inserted through those clip insertion holes 32d and 31d, which causes the clip member 34 to be engaged with the clip insertion holes 32d and 31d. As a result, the hooking portion 32c is hooked on the upper-side member 31.

The portion other than the peripheral portion in the lower-side member 32 is a recessed portion 32e recessed to the lower side than the peripheral portion. When the lower-side member 32 is in a state of being mounted and fixed on the upper-side member 31, the upper-side opening in the recessed portion 32e is blocked by the upper-side member 31. As a result, the recessed portion 32e serves as an inner space formed between the upper-side member 31 and the lower-side member 32.

On a portion that is a rear-side end portion of the lower surface of the front deflector 30 (the lower surface of the lower-side member 32) and is on the vehicle-width-direction outer side, a fin portion 32f that protrudes downward and guides the traveling air caused when the vehicle 1 travels forward to the vehicle-width-direction outer side by the end surface of the front side is provided. The traveling air hits the front-side end surface of the fin portion 32f. The front-side end surface of the fin portion 32f inclines so as to be positioned rearward toward the vehicle-width-direction outer side except for the end portion on the vehicle-width-direction outer side. The end portion of the front-side end surface of the fin portion 32f on the vehicle-width-direction outer side thereof extends to the vehicle-width-direction outer side in a substantially straight manner. The end of the fin portion 32f on the vehicle-width-direction outer side thereof is located on the vehicle-width-direction inner side than the end surface of the front wheel 3 (the front wheel 3 on the left side here) on the vehicle-width-direction outer side thereof (see FIG. 2 and FIG. 3).

In the recessed portion 32e of the lower-side member 32, the recessed amount of the portion corresponding to the fin portion 32f is larger than the recessed amount of other portions. The end surface of the fin portion 32f on the rear side thereof is formed by the vertical wall portion 32b.

The front deflector 30 (in detail, the lower-side member 32) includes an air inlet 32g (see FIG. 1 to FIG. 3, FIG. 5, and FIG. 6) that opens forward of the vehicle 1 and is for taking air into the inner space (the recessed portion 32e) of the front deflector 30 when the vehicle 1 travels forward, a wall rising portion 32h (see FIG. 5 and FIG. 6) serving as a guiding portion that directs the air taken into the inner space from the air inlet 32g to the rear side and the vehicle-width-direction outer side in the inner space, and air outlets 32i (see FIG. 4 to FIG. 6) that open rearward in the end surface (the vertical wall portion 32b) of the fin portion 32f on the rear side thereof and diagonally exhaust the air in the inner space to the vehicle-width-direction outer side toward the rear side.

The air outlets 32i are located on the vehicle-width-direction outer side than the air inlet 32g, and are located in a position that overlaps with the front wheel 3 in a front view of the vehicle 1. The air inlet 32g is located on the vehicle-width-direction inner side than the front wheel 3.

The opening area (in particular, the lengths in the up-down direction) of the air outlets 32i is larger than the opening area (in particular, the length in the up-down direction) of the air inlet 32g. The configuration is possible because the air outlets 32i open in the end surface of the fin portion 32f on the rear side thereof.

Figure 6:
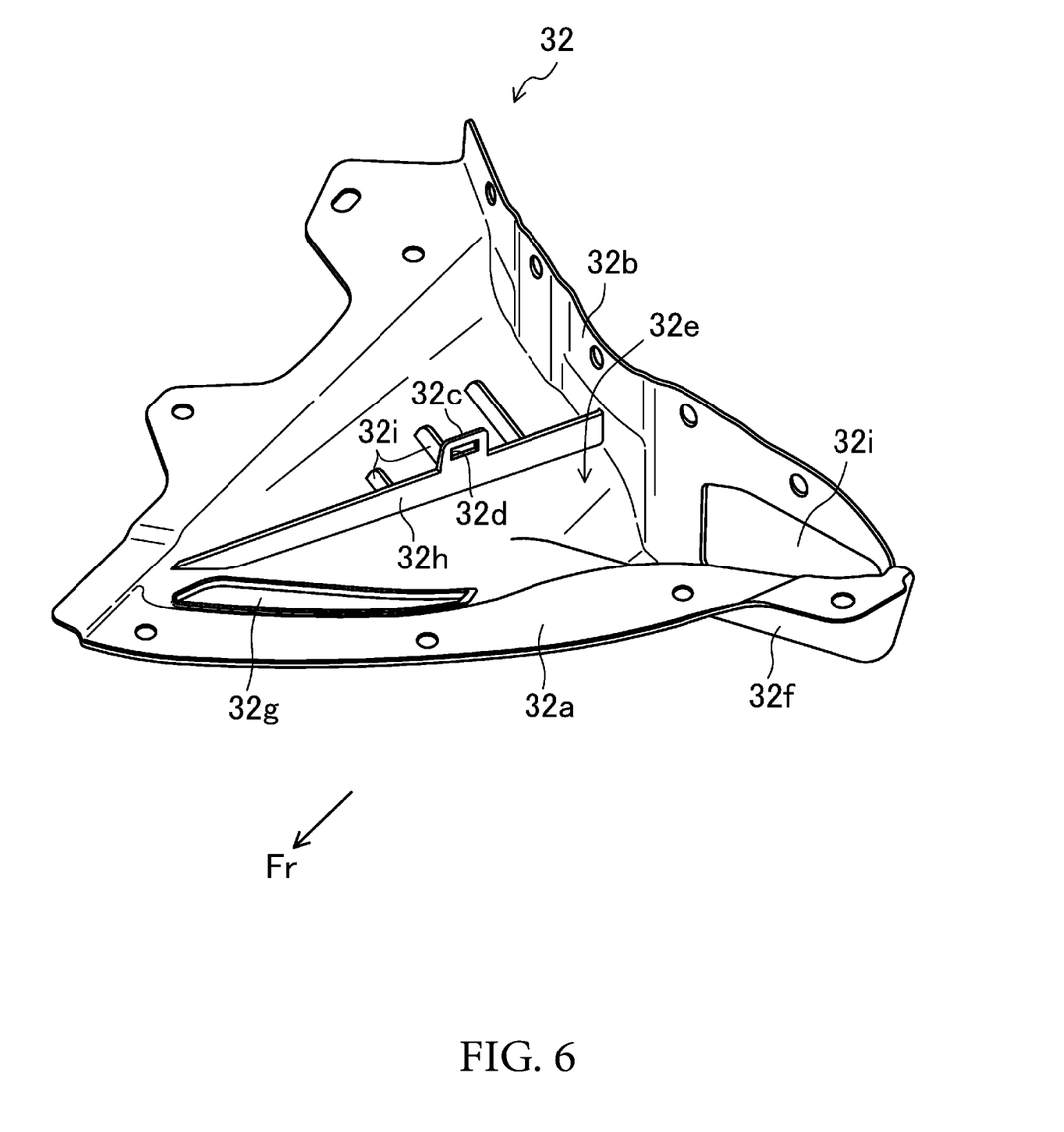
FIG. 6 is a perspective view illustrating the lower-side member in the front deflector.

As illustrated in FIG. 5 and FIG. 6, the wall rising portion 32h is vertically disposed on the bottom portion of the recessed portion 32e, and extends from a portion in the vicinity of the air inlet 32g on the vehicle-width-direction inner side of the air inlet 32g toward a portion in the vicinity of the air outlets 32i on the vehicle-width-direction inner side of the air outlets 32i so as to incline to the vehicle-width-direction outer side toward the rear side. The angle of inclination of the wall rising portion 32h to the vehicle-width-direction outer side with respect to the front-rear direction is set so that the air (traveling air) directed by the wall rising portion 32h does not hit the front wheel 3 after being exhausted from the air outlets 32i.

By the wall rising portion 32h, the inner space of the front deflector 30 is partitioned into an inner space portion and an outer space portion in the vehicle width direction, and the outer space portion serves as an air flow passage. The air inlet 32g and the air outlets 32i communicate with the outer space portion.

The lower-side member 32 is made of soft synthetic resin, and hence is easily deformed. Thus, a plurality of ribs 32j that extend in a direction perpendicular to the wall rising portion 32h are vertically disposed on the inner-space-portion side of the wall rising portion 32h on the bottom portion of the recessed portion 32e so that the wall rising portion 32h is not displaced to the inner-space-portion side by wind pressure. As described above, the hooking portion 32c to be hooked on the upper-side member 31 is provided on the portion other than the peripheral portion in the lower-side member 32, and hence portions (in particular, the central portion and the portion in the vicinity thereof) other than the peripheral portion in the lower-side member 32 are prevented from being displaced to the lower side. The hooking portion 32c is provided on the upper end surface of the wall rising portion 32h, and hence the deformation of the wall rising portion 32h is prevented in addition to the prevention of the displacement of the portion other than the peripheral portion in the lower-side member 32 to the lower side. Note that the hooking portion 32c is preferred to be provided on the central portion of the wall rising portion 32h in the longitudinal direction or the portion in the vicinity thereof.

With the configuration of the front deflector 30 described above, air is taken into the inner space (the recessed portion 32e) of the front deflector 30 from the air inlet 32g, and the air is directed to the rear side and the vehicle-width-direction outer side in the inner space by the wall rising portion 32h. The directed air (traveling air) is diagonally exhausted to the vehicle-width-direction outer side from the air outlets 32i toward the rear side (see a flow F2 of the traveling air that passes through the inner space of the front deflector 30 illustrated in FIG. 3). As a result of directing the traveling air by the wall rising portion 32h, the traveling air does not hit the front wheel 3 after being exhausted from the air outlets 32i. The air pressure in the space behind the fin portion 32f easily becomes a negative pressure by the fin portion 32f in front of the space. The air outlets 32i open in the end surface of the fin portion 32f on the rear side thereof, and are located on the vehicle-width-direction outer side than the air inlet 32g. Therefore, the traveling air directed by the wall rising portion 32h while passing through the inner space of the front deflector 30 is diagonally and smoothly exhausted to the vehicle-width-direction outer side from the air outlets 32i toward the rear side with great force.

Meanwhile, the traveling air that has hit the end surface of the fin portion 32f on the front side thereof is deflected to the vehicle-width-direction outer side by the fin portion 32f. Now, when the front deflector 30 does not have the air inlet 32g, the wall rising portion 32h, and the air outlets 32i as those in this embodiment, the traveling air deflected by the fin portion 32f is eventually bent to the rear side. When the end surface of the front wheel 3 on the vehicle-width-direction outer side thereof is shifted to the vehicle-width-direction outer side from the end of the fin portion 32f on the vehicle-width-direction outer side thereof by a large degree, the traveling air that is deflected and bent to the rear side by the fin portion 32f may hit the front wheel 3.

However, in this embodiment, the traveling air deflected by the fin portion 32f is pushed out to the vehicle-width-direction outer side by the traveling air exhausted from the air outlets 32i so as not to hit the front wheel 3 (see a flow F1 of the traveling air deflected by the fin portion 32f illustrated in FIG. 3). As a result, the traveling air that has passed through the vehicle-width-direction outer side with respect to the front deflector 30 (the fin portion 32f) is also pushed out to the vehicle-width-direction outer side so as not to hit the front wheel 3. Therefore, the traveling air deflected by the fin portion 32f and the traveling air that has passed through the vehicle-width-direction outer side with respect to the front deflector 30 (the fin portion 32f) also do not hit the front wheel 3.

Figure 7A:
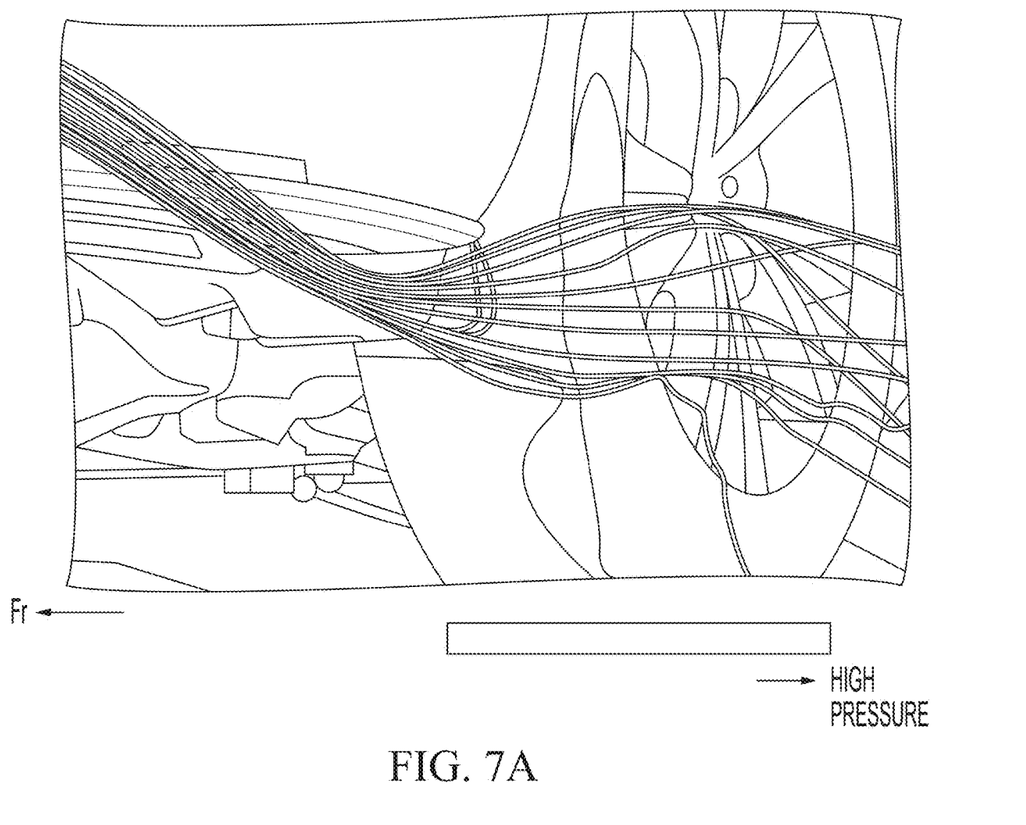
FIG. 7A shows a result obtained by providing a front deflector similar to the front deflector of this embodiment on a lower surface ahead of a front wheel in the vehicle and measuring the pressure on the front-side portion of the front wheel, and the flow of the traveling air.
Figure 7B:
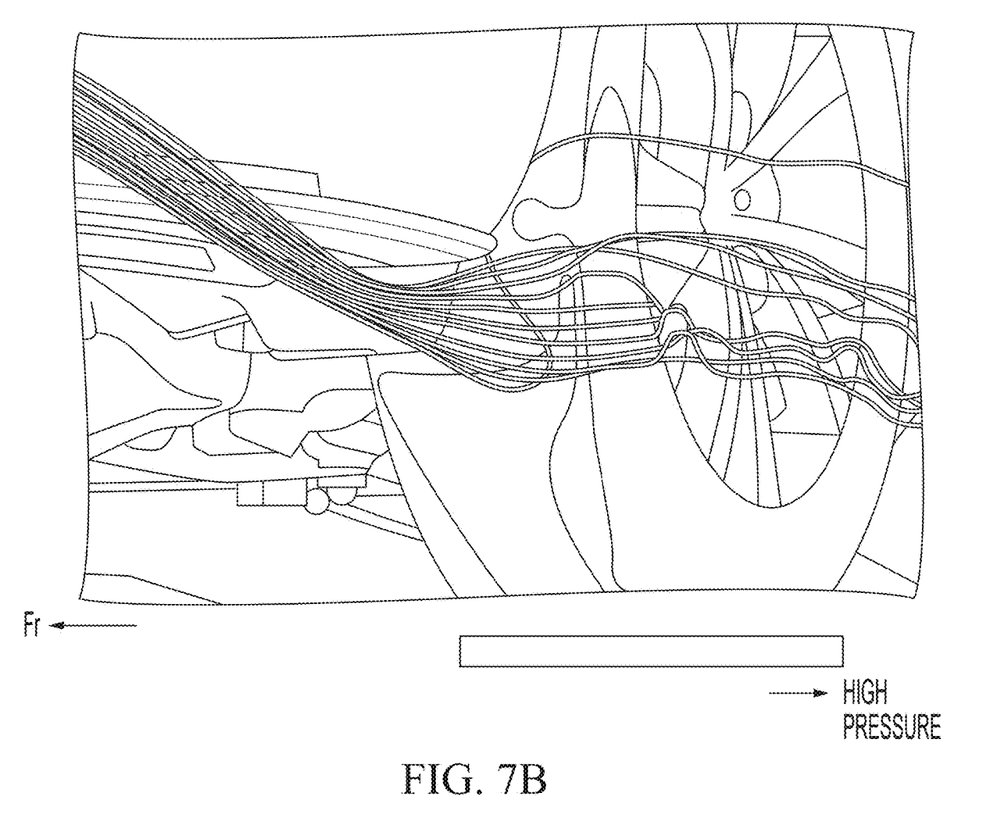
FIG. 7B shows a result obtained by providing a front deflector (the shape is the same as the front deflector in FIG. 7A) that does not have an air inlet, a wall rising portion, and an air outlet instead of the front deflector in FIG. 7A in the same position and in the same vehicle as in FIG. 7A and measuring the pressure on the front-side portion of the front wheel, and the flow of the traveling air.

FIG. 7A shows a result obtained by providing a front deflector similar to the front deflector 30 of this embodiment on the lower surface ahead of the front wheel in the vehicle and measuring the pressure on the front-side portion of the front wheel, and the flow of the traveling air. Meanwhile, FIG. 7B shows a result obtained by providing a front deflector (the shape is the same as the front deflector in FIG. 7A) that does not have the air inlet 32g, the wall rising portion 32h, and the air outlets 32i as in the front deflector 30 instead of the front deflector in FIG. 7A in the same position and in the same vehicle as in FIG. 7A, and measuring the pressure on the front-side portion of the front wheel, and the flow of the traveling air. The speed of the vehicle at the time of measurement is 100 km/h for both of the above.

In FIG. 7B, the pressure on the portion on the vehicle-width-direction outer side in the same height position as the fin portion of the front deflector in the front-side portion of the front wheel is extremely high (the color is dark). This is because the traveling air deflected by the fin portion of the front deflector is hitting the portion of which pressure is high. In FIG. 7B, it can be seen that a swirl is generated by the turbulence of the traveling air on the side of the front wheel.

Meanwhile, in FIG. 7A, the pressure is low (the color is light) throughout the vehicle width direction at the same height position as the fin portion of the front deflector in the front-side portion of the front wheel. This indicates that none of the traveling air exhausted from the air outlet, the traveling air deflected by the fin portion, and the traveling air that has passed through the vehicle-width-direction outer side with respect to the front deflector (fin portion) is hitting the front wheel. In other words, it is conceived that the traveling air deflected by the fin portion is pushed out to the vehicle-width-direction outer side by the traveling air exhausted from the air outlet, and is prevented from hitting the front wheel. In FIG. 7A, it can be seen that the turbulence of the traveling air hardly occurs and a swirl also hardly occurs on the side of the front wheel.

Therefore, in this embodiment, the front deflector 30 includes the air inlet 32g, the wall rising portion 32h serving as the guiding portion that directs the air taken into the inner space of the front deflector 30 from the air inlet 32g to the rear side and the vehicle-width-direction outer side in the inner space, and the air outlets 32i that diagonally exhaust the air in the inner space described above to the vehicle-width-direction outer side toward the rear side, and hence the hitting of the traveling air, which is caused when the vehicle 1 travels forward, against the front wheel 3 can be suppressed as much as possible.

The present disclosure is not limited to the embodiment described above, and substitution is possible without departing from the gist of the claims.

For example, in the embodiment described above, the front deflector 30 includes the fin portion 32f that guides the traveling air to the vehicle-width-direction outer side by the end surface of the front side, but does not necessarily need to include the fin portion 32f. Even when the fin portion 32f as above is not provided, the traveling air exhausted from the air outlets 32i can push out the traveling air that has passed through the vehicle-width-direction outer side with respect to the front deflector 30 to the vehicle-width-direction outer side so that the traveling air does not hit the front wheel 3.

The embodiment described above is merely an example, and the scope of the disclosure is not to be interpreted in a limited manner. The scope of the present disclosure is defined by the claims, and all modifications and changes that belong to the equivalent scope of the claims are within the scope of the present disclosure.

INDUSTRIAL APPLICABILITY

The present disclosure is useful as a front deflector provided on a lower surface ahead of front wheels in a vehicle.

REFERENCE SIGNS LIST 1 vehicle
3 front wheel
8 front wheel well
30 front deflector
31 upper-side member
32 lower-side member
32c hooking portion
32e recessed portion (inner space)
32f fin portion
32g air inlet
32h wall rising portion (guiding portion)
32i air outlet

What is claimed is:

1. A front deflector configured to be provided on a surface ahead of a front wheel of a vehicle, the front deflector comprising:
   a first opening beneath the vehicle in a forward position, the first opening configured to receive air into an inner space of the front deflector when the vehicle travels forward;
   a guide wall that directs the air received into the inner space from the first opening to at least a vehicle-width-direction outer side in the inner space; and
   a second opening that opens rearward of the first opening in a position that overlaps with the front wheel of the vehicle, and exhausts the air in the inner space to the vehicle-width-direction outer side, wherein
   a size of the second opening is greater than a size of the first opening.

2. The front deflector of claim 1, further comprising:
   a fin that protrudes downward from a lower surface of the front deflector, wherein the fin is configured to guide air, which is incident on the fin when the vehicle travels forward, to the vehicle-width-direction outer side.

3. The front deflector of claim 2, wherein
   the second opening is an opening on an outer surface of the deflector that faces a wheel well of the vehicle and extends vertically upward from a bottom portion of the fin.

4. The front deflector of claim 1, wherein
   the second opening is located closer to the vehicle-width-direction outer side than the first opening.

5. The front deflector of claim 1, wherein
   the front deflector is formed by at least an upper member and a lower member.

6. The front deflector of claim 5, wherein
   the lower member is fixed to the upper member at a peripheral portion of the lower member.

7. The front deflector of claim 6, wherein
   the lower member comprises a hooking structure configured to be hooked on the upper member at a portion other than the peripheral portion.

8. The front deflector of claim 7, wherein
   the guide wall is formed by a wall rising vertically from the lower member.

9. The front deflector of claim 8, wherein
   the hooking structure is provided on an upper edge surface of the wall.

10. The front deflector of claim 5, wherein
    the inner space is a space between the upper member and the lower member.

11. The front deflector of claim 10, wherein
    a size of the inner space closer to the first opening is smaller than a size of the inner space closer to the second opening.

12. The front deflector of claim 1, wherein
    an angle of inclination of the guide wall to the vehicle-width-direction outer side with respect to the front-rear direction is set so that the air directed by the guide wall does not hit the front wheel after being exhausted by the second opening.

13. A front deflector configured to be provided on a surface ahead of a front wheel of a vehicle, the front deflector comprising:
a first opening beneath the vehicle in a forward position, the first opening configured to receive air into an inner space of the front deflector when the vehicle travels forward;
a guide wall that directs the air received into the inner space from the first opening, to at least a vehicle-width-direction outer side in the inner space; and
a second opening that opens rearward of the first opening in a position that overlaps with the front wheel of the vehicle, and exhausts the air in the inner space to the vehicle-width-direction outer side, wherein
the front deflector is formed by at least an upper member and a lower member, and
the guide wall is formed by a wall rising vertically from the lower-side member.

14. The front deflector of claim 13, further comprising:
a plurality of ribs formed in the lower-side member that extend in a direction perpendicular to, and in contact with, the wall guide wall.

15. The front deflector of claim 14, wherein
the plurality of ribs are configured to prevent the guide wall from being displaced by wind pressure caused by the received via the first opening.

16. A front deflector configured to be provided on a surface ahead of a front wheel of a vehicle, the front deflector comprising:
an air inlet disposed on a front-facing surface of the vehicle and configured to receive air into an inner space of the front deflector;
a wall that directs the air received into the air inlet to at least a vehicle-width-direction outer side of the inner space; and
an air outlet provided on a rear-facing surface of the front deflector that faces a wheel well of the vehicle and exhausts the air from the inner space to the vehicle-width-direction outer side, wherein
a height and width of the air outlet is greater than a height and width of the air inlet.

17. The front deflector of claim 16, further comprising:
a fin protruding downward from a lower surface of the front deflector, wherein the fin is configured to guide air, which is incident on the fin when the vehicle travels forward, to the vehicle-width-direction outer side.

\* \* \* \* \*